(12) United States Patent
Pulos et al.

(10) Patent No.: US 8,296,186 B2
(45) Date of Patent: Oct. 23, 2012

(54) SYSTEM AND METHOD FOR DETERMINING LOCATIONS FOR PLACEMENT OF PRINTED PROMOTIONAL MATERIAL AT POINT-OF-PURCHASE ON A RETAIL STRUCTURE

(75) Inventors: Dan Chris Pulos, Thousand Oaks, CA (US); Jack Stines Wilson, Franklin, TN (US)

(73) Assignee: Franke Technology and Trademark Ltd (CH)

( * ) Notice: Subject to any disclaimer, the term of this patent is extended or adjusted under 35 U.S.C. 154(b) by 200 days.

(21) Appl. No.: 12/730,601

(22) Filed: Mar. 24, 2010

(65) Prior Publication Data
US 2011/0238489 A1 Sep. 29, 2011

(51) Int. Cl.
*G06Q 30/00* (2012.01)
(52) U.S. Cl. .................................................. 705/14.65
(58) Field of Classification Search ............. 705/14.65
See application file for complete search history.

(56) References Cited

U.S. PATENT DOCUMENTS

2008/0208719 A1* 8/2008 Sharma et al. ................... 705/29
2008/0319853 A1* 12/2008 Johnson, Jr. ..................... 705/14

* cited by examiner

*Primary Examiner* — Naresh Vig
(74) *Attorney, Agent, or Firm* — Pepper Hamilton LLP (57) ABSTRACT

A system and method of determining point-of-purchase placement locations for printed promotional materials on a retail structure includes loading, by a processing device from a database, data representative of a retail structure; determining a plurality of advertisement placement locations on the retail structure; determining a point-of-placement priority value for each of the plurality of advertisement placement locations; receiving an advertising campaign comprising data representing a plurality of advertising campaign items, each item including an associated item priority value; determining a location on the retail structure for each of the advertising campaign items based upon the item priority values and the point-of-placement priority values; and providing a report to an operator of the retail structure indicating where each of the advertising campaign items is to be displayed on the retail structure.

18 Claims, 9 Drawing Sheets

SYSTEM AND METHOD FOR DETERMINING LOCATIONS FOR PLACEMENT OF PRINTED PROMOTIONAL MATERIAL AT POINT-OF-PURCHASE ON A RETAIL STRUCTURE

BACKGROUND

The present document relates to a system and method for determining the placement of advertising or other promotional materials. More specifically, the present document relates to instructing clients where to position advertising campaign materials in a retail structure or store.

Many retail companies or chains manage a large number of stores or retail structures, either company owned or through licensed franchise locations. Often, when the retail chain releases a new product, service, or other feature, the chain launches a related advertising campaign. This campaign may include signs, banners, graphics, and other items to be positioned around a store or retail structure. Similar advertising materials may be sent from a central agency or franchiser to each store or retail structure participating in the advertising campaign. Each piece of advertising material may include or be provided with instructions on where to position the advertising material in the store or retail location. For example, a particular sign may include the instructions "place on front door."

One drawback to this approach is that each store or retail location may be constructed differently, with various components of the store located in random areas, or not included in the design of the store at all. For example, a specific restaurant chain may launch a new advertising campaign for all its stores in the United States. However, the stores may not all having similar architectural features. One store may be in an airport, consisting of a counter-service location having several cash registers, a menu board indicating items available for sale, and a kitchen out of view of the public. This location varies greatly from a standalone location which may have one or more entrance doors, a large number of windows, multiple counters, multiple menu boards, space for stand-up displays, and potentially an outside sign that can be changed to include updated advertisements. Similarly, one standalone location may vary from another standalone location. Aside from architectural features such as doors, windows counters, menu boards, etc., various standalone locations may have different traffic patterns and historic sales information, thereby altering optimal positioning of advertisement materials on each standalone location. In this example, sending the same set of advertising campaign items to each store would be wasteful as the airport location would use only a fraction of the materials used by the standalone stores, and each standalone store may have a different number of materials, as well as different placement locations for similar materials.

SUMMARY OF THE INVENTION

The invention described in this document is not limited to the particular systems, methodologies or protocols described, as these may vary. The terminology used herein is for the purpose of describing particular embodiments only, and is not intended to limit the scope of the present disclosure.

It must be noted that as used herein and in the appended claims, the singular forms "a," "an," and "the" include plural reference unless the context clearly dictates otherwise. Unless defined otherwise, all technical and scientific terms used herein have the same meanings as commonly understood by one of ordinary skill in the art. As used herein, the term "comprising" means "including, but not limited to."

In one general respect, the embodiments disclose a method of determining point-of-purchase placement locations for printed promotional materials on a retail structure. The method includes loading, by an application running on a processing device from a database stored on a computer readable medium, data representative of a retail structure; determining, by the processing device, a plurality of advertisement placement locations on the retail structure; determining, by the processing device, a point-of-placement priority value for each of the plurality of advertisement placement locations; receiving, by the processing device, an advertising campaign comprising data representing a plurality of advertising campaign items, each item including an associated item priority value; determining, by the processing device, a location on the retail structure for each of the advertising campaign items based upon the item priority values and the point-of-placement priority values; and providing, by the processing device, a report to an operator of the retail structure indicating where each of the advertising campaign items is to be displayed on the retail structure.

In another general respect, the embodiments disclose a system for determining point-of-purchase placement locations for printed promotional materials on a retail structure. The system includes a processing device and a computer readable storage medium in communication with the processing device, wherein the computer readable medium comprises one or more programming instructions configured to load, by an application running on a processing device from a database stored on a computer readable medium, data representative of a retail structure; determine, by the processing device, a plurality of advertisement placement locations on the retail structure; determine, by the processing device, a point-of-placement priority value for each of the plurality of advertisement placement locations; receive, by the processing device, an advertising campaign comprising data representing a plurality of advertising campaign items, each item including an associated item priority value; determine, by the processing device, a location on the retail structure for each of the advertising campaign items based upon the item priority values and the point-of-placement priority values; and provide, by the processing device, a report to an operator of the retail structure indicating where each of the advertising campaign items is to be displayed on the retail structure.

DETAILED DESCRIPTION

For purposes of the discussion below, a "retail structure" refers to either (a) a standalone structure, or (b) a counter service location occupying space in a larger, potentially shared structure.

An "advertising campaign" refers to one or more pieces of printed or electronically displayed advertising materials intended to be displayed in one or more retail structures.

A "cooperative" or "co-op" refers to a group of two or more retail structures having a related geographic location such as a city, state, or region.

For specific retail chains or companies that have a large number of retail structures, advertising campaigns are generally designed to be displayed in multiple retail structures. A restaurant chain may have a number of retail structures organized into co-ops based upon geographic locations. For example, a co-op representing Pennsylvania may include 100 retail structure locations. The restaurant chain may want to target a specific advertising campaign to the Pennsylvania co-op, having location specific information such as promotions related to local sports teams, upcoming community events, or other information that would not apply to other co-ops such as a southern California co-op.

Additionally, beyond targeting the advertising campaign to a specific co-op or group of retail structures, the restaurant chain may also desire to specify or suggest the placement of each piece of advertising in the advertising campaign in each retail structure. The following discussion of FIGS. 1-7 discusses determining a location for and the placement of individual advertising pieces in a retail structure. The following discussion may be applicable for a single, independently owned and operated retail structure, or a chain of two or more retail structures, whether commonly owned, independently owned, or a combination of the two. For exemplary purposes, retail structures belonging to a restaurant chain will be discussed herein. It should be noted that a restaurant chain is discussed herein by way of example only, and the invention is applicable to any type of retail structures.

Figure 1:
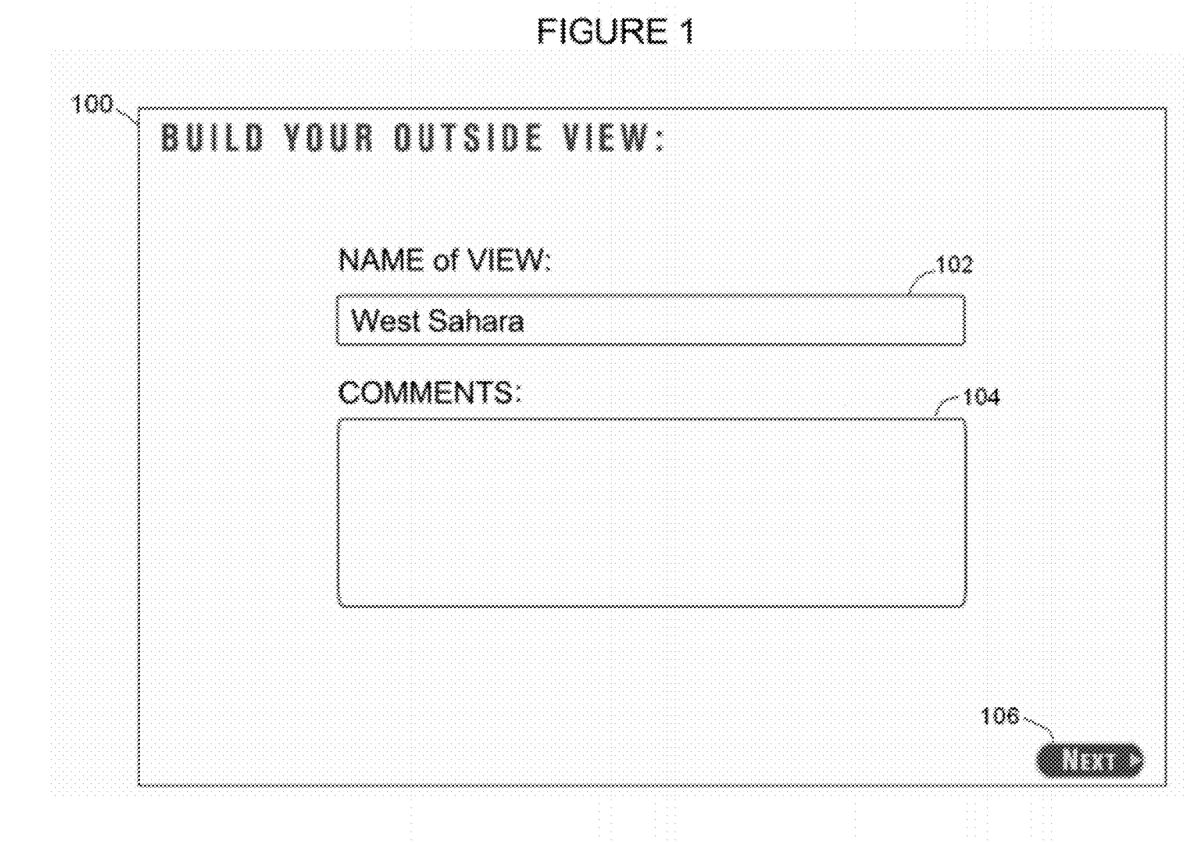
FIG. 1 illustrates an exemplary screenshot of a user interface for designing a template for a retail location according to an embodiment.

FIG. 1 illustrates a user interface 100 that may be used to design and build a template of an outside view of an exemplary retail structure. A potential user of the user interface 100 may have several pictures or photographs of the retail structure, building plans, site notes or some other reference materials to refer to during the design of the template. The user may enter a name 102 for the specific view being created for the template as well as any comments 104 related to the view of the retail structure being created. The view name 102 may be chosen based upon a specific naming convention. For example, the name of the street facing the view may be used, e.g., "West Sahara". Alternatively, a descriptive name may be used such as "front door view" or "parking lot view." The comments 104 may be chosen to include specific information such as traffic patterns around the retail structure, historic sales data for the retail structure, and any other information the user may determine to be relevant. Once the user has entered a view name 102 and any comments 104, the user may select to continue to the next 106 screen of user interface 100.

Figure 2A:
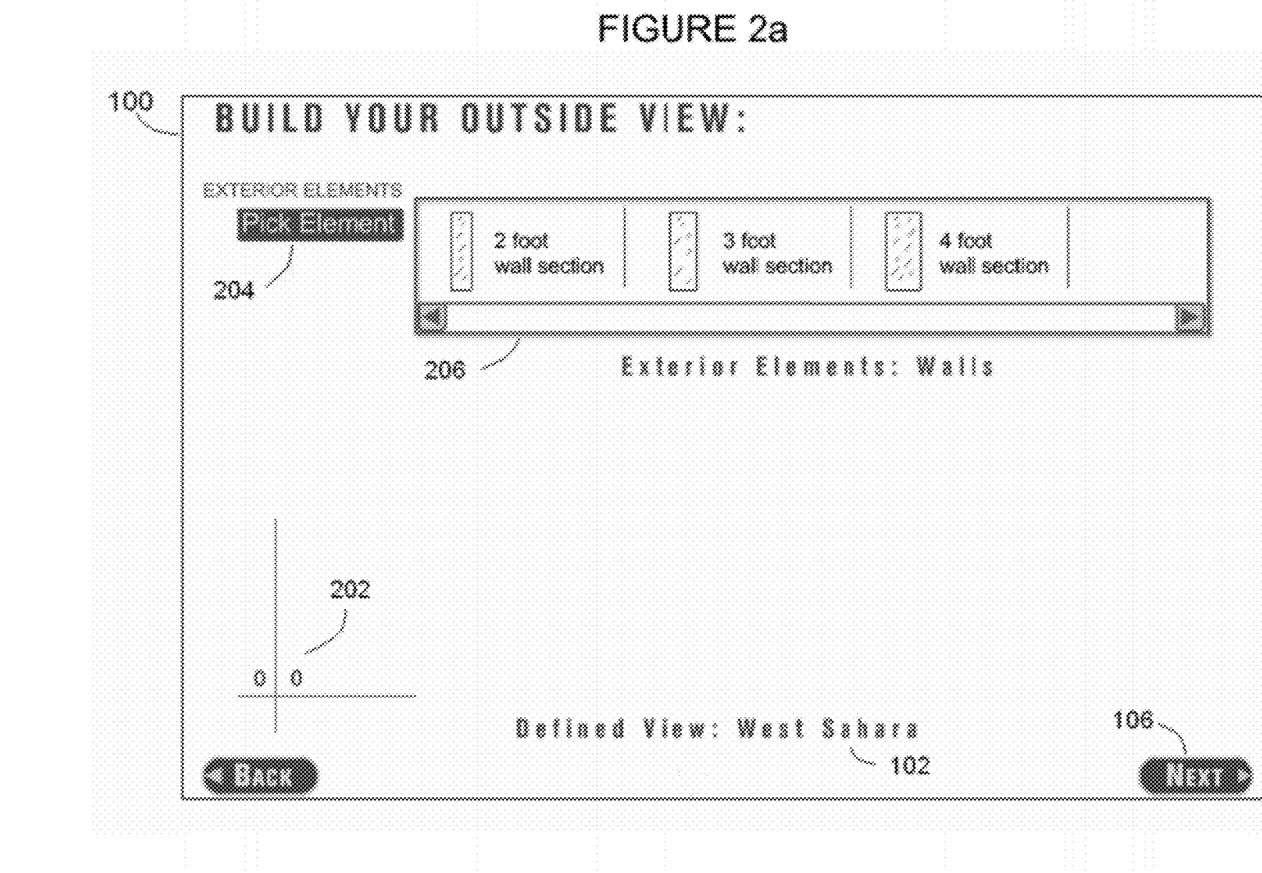
FIGS. 2a-c illustrate additional exemplary screenshots of a user interface for designing a template for a retail location according to an embodiment.
Figure 2B:
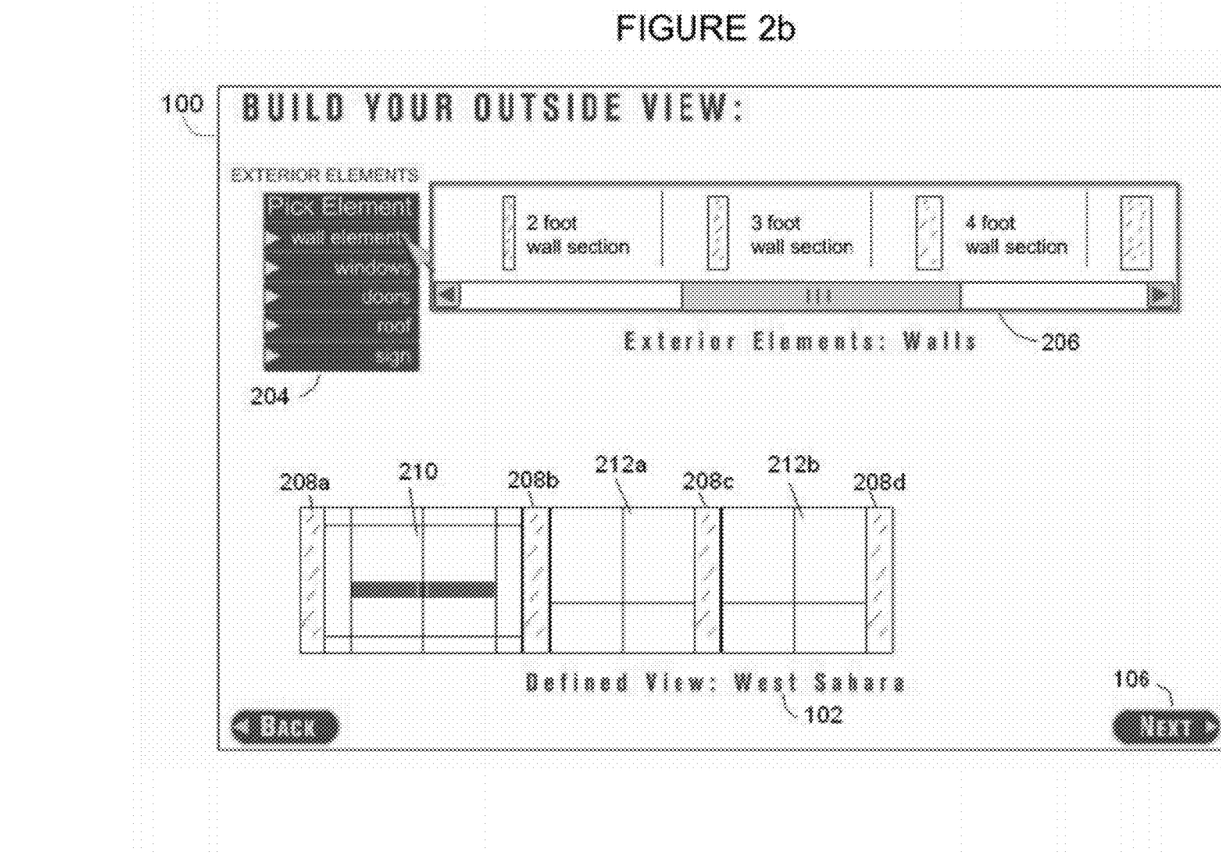
Figure 2C:
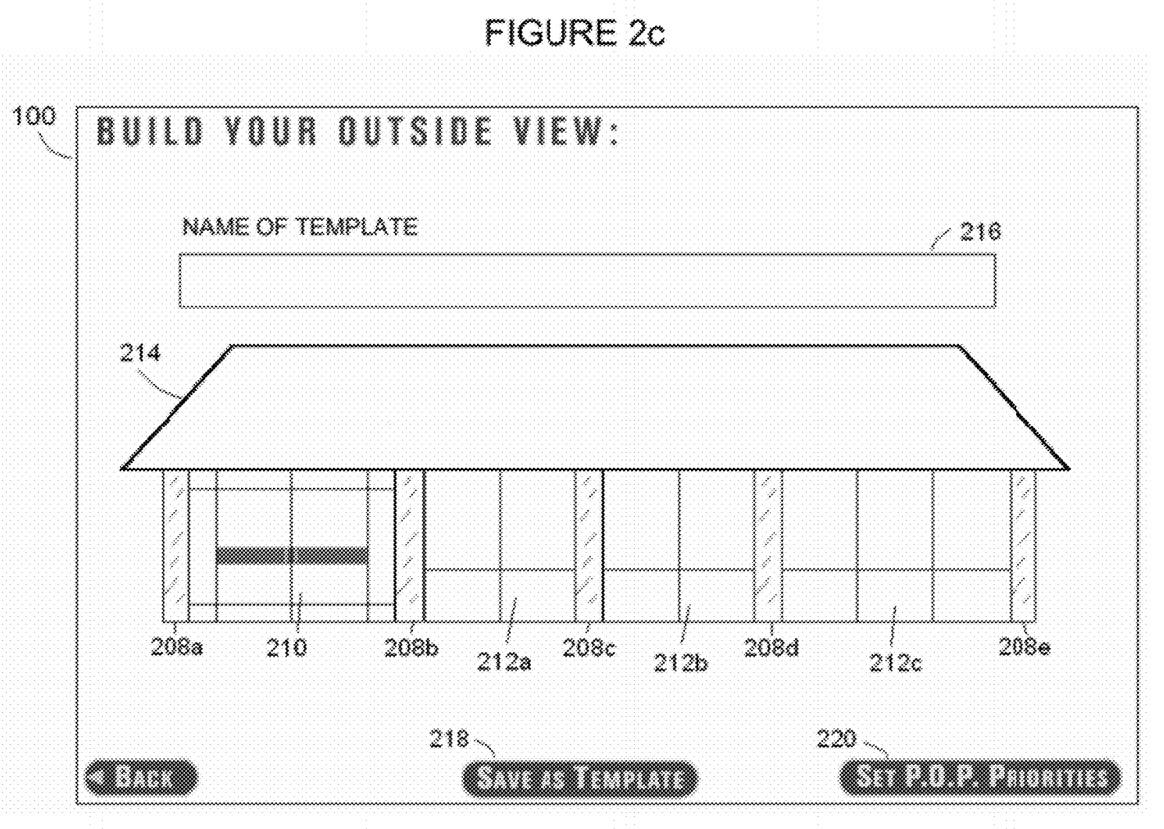

FIGS. 2a-c illustrate various screenshots of user interface 100 during the design and construction of a view of a specific retail structure. As shown in FIG. 2a, the user interface 100 may include a building area 202 where a user may drag and drop various architectural or structural components of the retail structure to create the view. The user interface may include a drop-down list 204 of various elements that may be included in the view of the retail structure. As shown in FIG. 2a, the user may select exterior wall elements from the drop down list 204, resulting in the display of a visual list 206 of available exterior wall elements.

The user may drag and drop various architectural or structural components from the visual list 206 to construct the view of the retail structure. As shown in FIG. 2b, the user may add various other components to the view such as windows, doors, roofs, signs, and other various components selected from the drop-down list 204. In the exemplary view of the retail structure shown in FIG. 2b, the user has added various walls 208a, 208b, 208c and 208d to the view, as well as doors 210, and two-panel windows 212a and 212b.

As shown in FIG. 2c, the exemplary outside view of the retail structure is completed. The completed view may include walls 208a, 208b, 208c, 208d and 208e, doors 210, two-panel windows 212a and 212b, three-panel window 212c, and roof 214. Additional features such as wall signs, roof signs, and other display locations may be included depending on the layout of the retail structure. Once the view is completed, the user may have the option to name the template 216 (if the template has not been named already), as well as save the view to the template 218. The template will hold data about each architectural or structural element, including priority value (of assigned, and as described in more detail below) and element type (e.g., wall, window, door, etc.).

Figure 5:
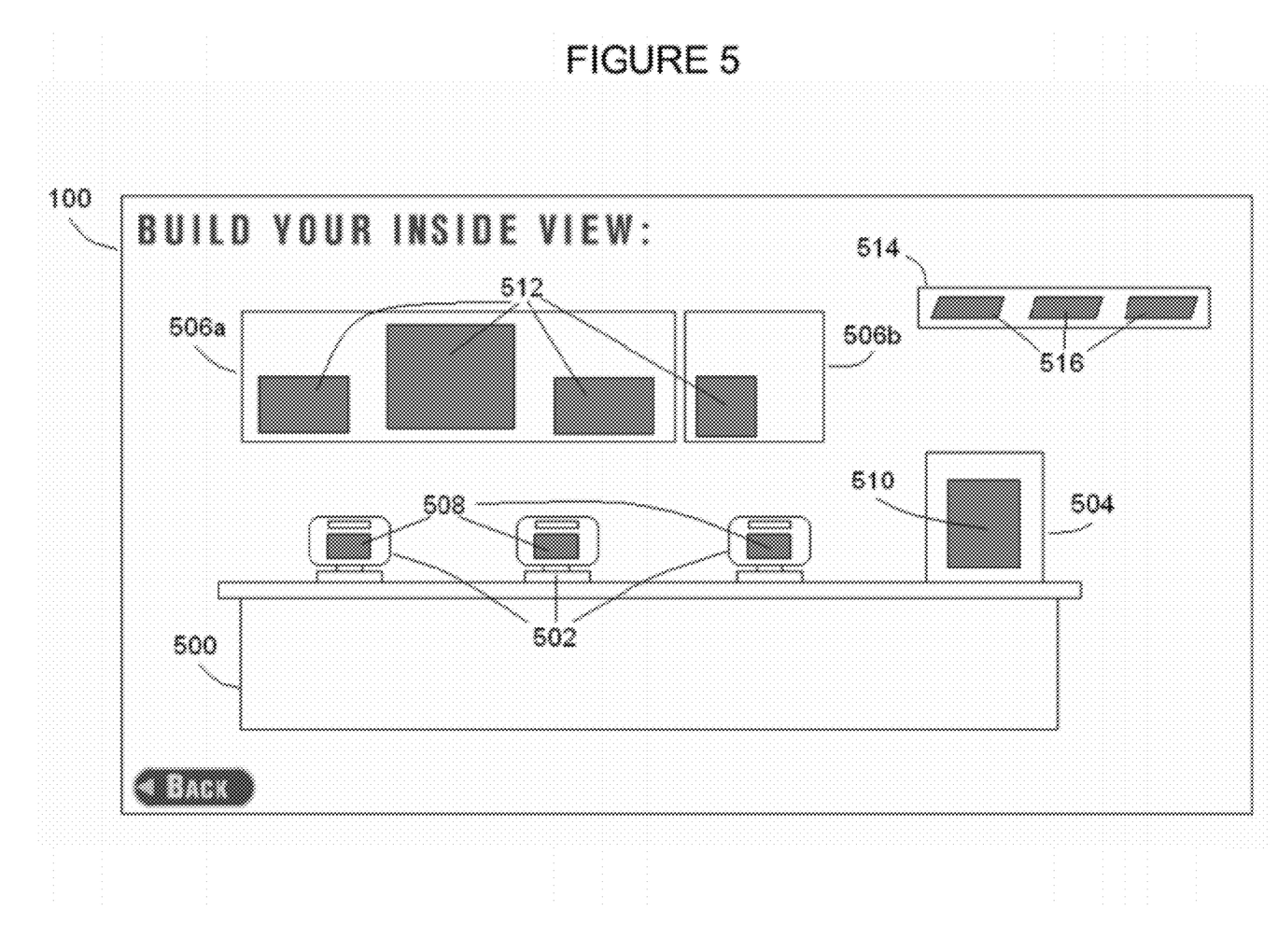
FIG. 5 illustrates an exemplary template for an additional retail structure according to an embodiment.

It should be noted that, depending on the type of retail structure, a number of views may be associated with a single template. For example, a standalone retail structure may have five or more views, four exterior views and an interior view (as shown in FIG. 5). A counter-service retail location may have a single view of the counter area. Additionally, exterior views may include additional features or components not discussed above. For example, if an exterior view includes a portion of a parking lot, any light poles, road frontage signs, reader boards, digital displays, or other areas where advertising materials may be displayed, those other areas may be included in the views.

A template of the one or more created views may be saved in a variety of manners. A database entry may be created for each retail structure, the entry including the details related to each view of the template as well as general identification information about the retail such as restaurant name or number, address, ownership information, email address, group membership information, and other similar identification information. The details may be organized into a specific data structure such as a linked list where each detail is tied to the next. The details may be loaded from the database and configured according to their position on the linked list to reconstruct each view of the template. Additional data structures may be used as well, such as hierarchal trees, multi-layer graphical images, vector-based designs, and other applicable structures for saving the template.

Figure 3:
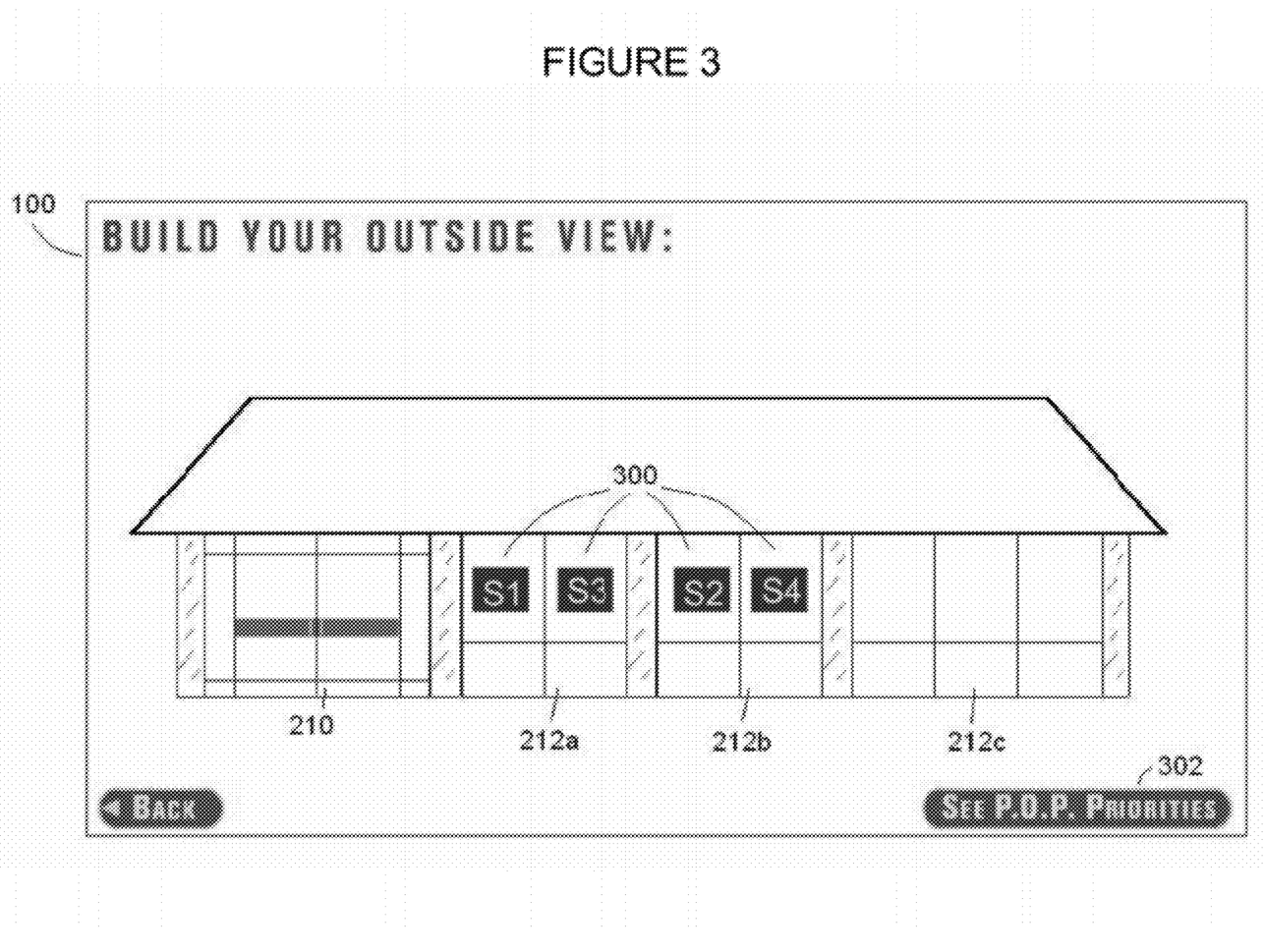
FIG. 3 illustrates an exemplary screenshot of a user interface for assigning priority values to various locations on the template created in FIGS. 1-2c according to an embodiment.

As shown in FIG. 2c, a user may set 220 any point-of-purchase (P.O.P.) priority values for various areas or advertisement placement locations in the view of the retail structure. The P.O.P. priority values may be a set of positional values ranking the various advertisement placement locations of the retail structure for advertising purposes. FIG. 3 illustrates a screenshot of user interface 100 where various P.O.P. priority values 300 may be assigned to various architectural or structural components of an exemplary view of a retail structure, such as doors 210 and windows 212a, 212b and 212c, thereby designating advertisement placement locations. The user may assign the P.O.P. priority values according to various criteria. For example, the highest P.O.P. priority value may be assigned where the most traffic will pass by. Conversely, the lowest P.O.P. priority value may be assigned to a location where the least traffic will pass by. Alternatively, some or all of the P.O.P. priority values may be predetermined and pre-assigned, or the P.O.P. priority values may be assigned based on a predetermined rule set. A specific algorithm or rule set may be used for prioritizing the various locations on the retail structure. Such an algorithm or rule set may take into account traffic around the retail structure, historic sales information about the retail structure, and other relevant information to determine which locations on the retail structure should be the highest P.O.P. priority value locations. For example, a rule set may always require the highest P.O.P. value to be assigned to a door or a structural element adjacent to a door. A rule set may also require that one side (left or right) of a two panel window always take priority over the other.

Figure 4:
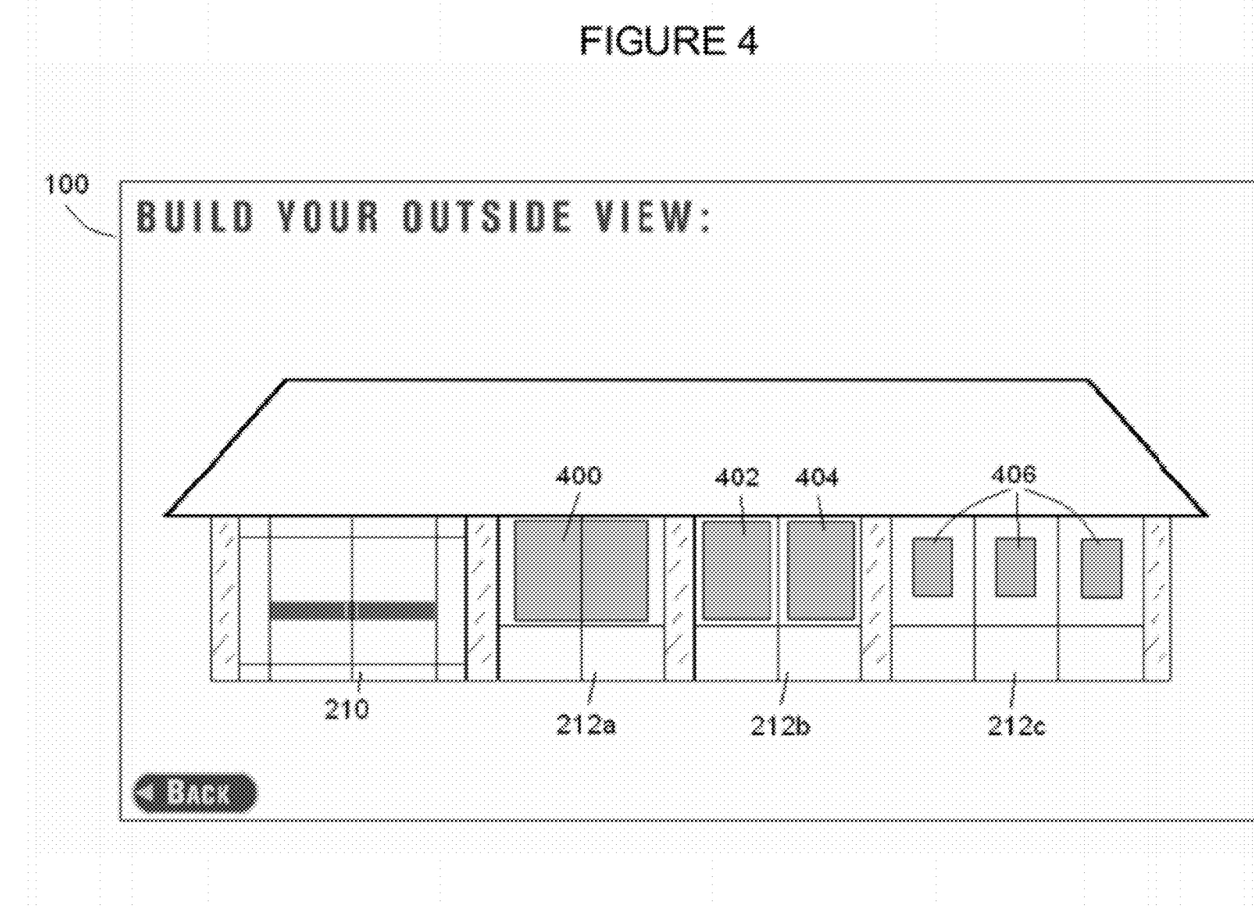
FIG. 4 illustrates the exemplary screenshot of a user interface for determining the placement of pieces of advertising on the template created in FIGS. 1-2c based upon the assigned priority values of FIG. 3 according to an embodiment.

The user may select an option to see 302 the P.O.P. priority values, and a model of the retail structure showing any corresponding advertising pieces from an advertising campaign, after the P.O.P. priority values are assigned. FIG. 4 illustrates an exemplary screenshot of user interface 100 where various advertising pieces have been placed on a view of a retail structure according to the P.O.P. priority values as assigned by a user. As shown in FIG. 4, there may be various types of advertisements. Advertisements may include a two-panel advertisement 400, a single panel large advertisement such as 402 and 404, and a single panel small advertisement such as the three advertisements labeled 406. Depending on the advertising campaign, each type of advertisement may also be assigned a type code and/or an item priority value. As an example, a two-panel advertisement may have a type code indicating that it must be displayed on adjacent or two-panel windows. It also may have a high item priority level as there may be a limited number of windows having two adjacent panels. Similarly, single panel large advertisements may have a high item priority level, and single panel small advertisements may have a lesser item priority level. As another example, an advertisement for a short-term promotion may be assigned a high item priority value than an advertisement for a long-term promotion. Or, an advertisement for a particular product (e.g., a seasonal beverage) may be given a higher item priority value than a different product (e.g., a standard dessert). Similarly, a digital advertisement or loop or series of digital or dynamic advertisements may have an associated type code indicating the digital advertisement must be displayed on a digital display, provided the retail structure has a digital display. It should be noted, however, that the item priority levels and type codes as discussed herein are provided by way of example only.

During the determination of position or placement of the advertising items, various algorithms or rules may be applied to determine specific display locations on a template for each piece of advertising material. For example, a two-panel advertisement type code may indicate that the two-panel advertisement should be positioned first (i.e., take priority over a single panel advertisement) as there may be a limited number of suitable adjacent window panels. If there are more than one two-panel advertisements, the item priority values may be used to determine which two-panel advertisement is displayed in a two-panel window having the highest P.O.P. priority value. For example, if there are two two-panel windows in a retail structure, one having a P.O.P. priority rating of 3, and the other having a P.O.P. priority rating of 5, the two-panel advertisement having the highest item priority value would be assigned to the window having the rating of 3.

If a set of advertising pieces all have the same type code, or the only remaining pieces of an advertising campaign have the same type code, then the rule set may determine that the remaining pieces of advertising are positioned based solely upon the item priority value.

It should be noted that as an alternative, a user may determine the display locations for each piece of advertising in an advertising campaign may be utilized by a user interacting with the user interface 100 as discussed above. The user interface 100 may present rules or suggested locations to the user for user confirmation, rejection, or modification. Alternatively, the algorithms and rule sets may be automated such that a processing device may determine the position for each piece of advertising after the P.O.P. priority values are determined for each display location, and the type code and item priority values are determined for each piece of advertising. It should also be noted that the algorithms and rule sets discussed herein are provided by way of example only.

The view as shown in FIG. 4, including a potential positioning of advertising pieces 400, 402, 404 and 406, may be saved, printed, and included in a report or a notification sent to an operator of the retail structure along with the individual advertising pieces. Additionally, if there are any digital advertisements to be displayed on a digital display in the retail structure, a storage medium such as a disk or solid state memory card may be sent to the operator as well for uploading the digital advertisements to the digital displays. The report may provide instruction for the operator of the retail structure to position the advertising pieces as determined by the user designing the template via user interface 100. The report may be valid for a period of time, such as one month, after which time the operator of the retail structure may be provided with an new or updated report and new advertising pieces corresponding to a new advertising campaign. Additionally, based upon the report and an indication of which pieces of the advertising campaign are to be displayed in the retail structure, the pieces of advertising material sent to the operator may be limited to only those pieces that are to be used at that specific retail location, thereby reducing or eliminating any unused or wasted advertising materials.

Advertisement placement locations on the retail structure not indicated as having an associated advertising piece on the advertising campaign report may be open to the operator to place materials specific to that individual retail structure. For example, if a window panel does not have any associated advertising piece in the report, the operator may place a help wanted sign, advertisements for other local businesses in the area, or other materials unique to that retail location.

Along with the exterior views of a retail structure, an interior view of the structure may be included in the template of the retail structure. FIG. 5 illustrates an exemplary view of the interior of a retail structure as shown in user interface 100. The interior view may include various architectural or structural components such as a counter 500, cash registers 502, a standalone display 504, and various menu boards 506a and 506b. Similar to the exterior view, the interior view may have various pieces of advertising associated with specific advertisement placement locations in the retail structure. For example, small advertisements 508 may be placed on the front of each cash register 502. An advertisement 510 may be included for display on the standalone display 504, and various inserts 512 may be included for display on menu-boards 506a and 506b.

In addition to the static advertisement pieces as discussed above, dynamic advertisement pieces may be included in an advertising campaign. Dynamic advertisement pieces may be advertising pieces that are presented on a digital or otherwise changeable display, so that one advertisement piece may be replaced by a different piece by electronic command. Optionally, the pieces themselves may be dynamic, such as through audio, video, or other dynamic features. As shown in FIG. 5, one or more electronic displays 514 may be included in a retail structure. Each electronic display 514 may be configured to show one or more dynamic advertisements or messages 516 for a selected time period. Depending on the capabilities of each electronic display 514, the dynamic advertisements 516 may be shown randomly, in a predetermined pattern, or in one or more continual loops. Additionally, depending on the capabilities of each electronic display 514, the dynamic advertisements 516 may include color images, animations, sound, or other similar features.

When determining advertising materials to be included in a specific advertising campaign, a remote control operator such as an advertising agency or corporate or regional headquarters selecting the advertising pieces for a campaign may prepare a digital data file containing the one or more dynamic advertisements 516. Depending on the capabilities of the retail structure and the electronic display 514, the digital data file may be directly loaded on one or more electronic displays 514 by the advertising agency, or otherwise forwarded to an operator of the retail structure as a data file via either email or on a physical memory device for loading and display on one or more electronic displays. The dynamic advertisements 516 may have a type code and priority rating as well. For example, if a dynamic advertisement includes a color animation, it may have a type code indicating that it should be displayed on an electronic display capable of showing color animations. Similarly, a dynamic advertisement 516 for a breakfast sandwich may be type coded and prioritized such that it is displayed in the morning on an electronic display 514 located at or near the menu boards 506a and 506b. Once breakfast is over, a dynamic advertisement 516 for a lunch special may replace the dynamic advertisement for the breakfast sandwich on an electronic display near the menu boards 506a and 506b, and the dynamic advertisement for the breakfast sandwich is moved to another electronic display in the retail structure until the next time period when breakfast is being served.

The operator overseeing the advertising campaign may be able to remotely access each electronic display 514 to automatically update the dynamic advertisements 516 being currently displayed. This may provide a level of real-time customization of advertising campaigns. For example, if a city's sports team wins a championship, some or all electronic displays 514 in each retail structure in that city (or a co-op local to that city) may be automatically updated from a remote location to display an advertising campaign related to that sports team's victory.

It should be noted that the electronic display 514 of FIG. 5 is shown in the interior view of a retail structure by way of example only. Electronic displays may be positioned about a retail structure in various areas, such as on a road sign, in one or more window panels, on one or more menu boards, on one or more cash registers, or various other suitable locations in a retail structure.

Unlike the exterior views, P.O.P. priority values may or may not be assigned to advertisement placement locations identified on the interior view. If the interior only has a limited number of advertisement placement locations to display advertising, the advertisement placement locations may not be assigned a priority. Rather, the number of advertising pieces intended to be displayed in the interior of a retail structure included in each advertising campaign shipment may be altered to match the number of advertisement placement locations in the interior view. For example, if the retail structure includes four cash registers 502, four identical small advertisements 508 may be included as cash register overlays in the advertising campaign shipment for that retail structure. However, P.O.P. priority values may be assigned to advertisement placement locations in the interior view. For example, if there are multiple menu boards in the interior view, the advertisement placement locations on the menu boards may be assigned a P.O.P priority value for determining which piece of advertising is displayed in which menu board.

In an example where a retail structure is a counter-service location having no standalone structure, an interior view like that shown in FIG. 5 may be the only view in the template. However, in busy areas such as airports, malls, and sporting arenas, multiple counter-service locations may be included, resulting in multiple views in the associated template. Similarly, there may be multiple interior views for a standalone retail structure depending on the arrangement of the counter areas in the retail structure.

It should be noted that various pieces of advertising may be included in an advertising campaign. For example, an advertising campaign may include posters, single panel window displays, two-panel window displays, roof banners, counter displays, menu displays, cash register overlays, free standing or standalone cutouts, door panel displays, light post displays, and any other display, banner or cutout that may be included in a retail structure.

Figure 6:
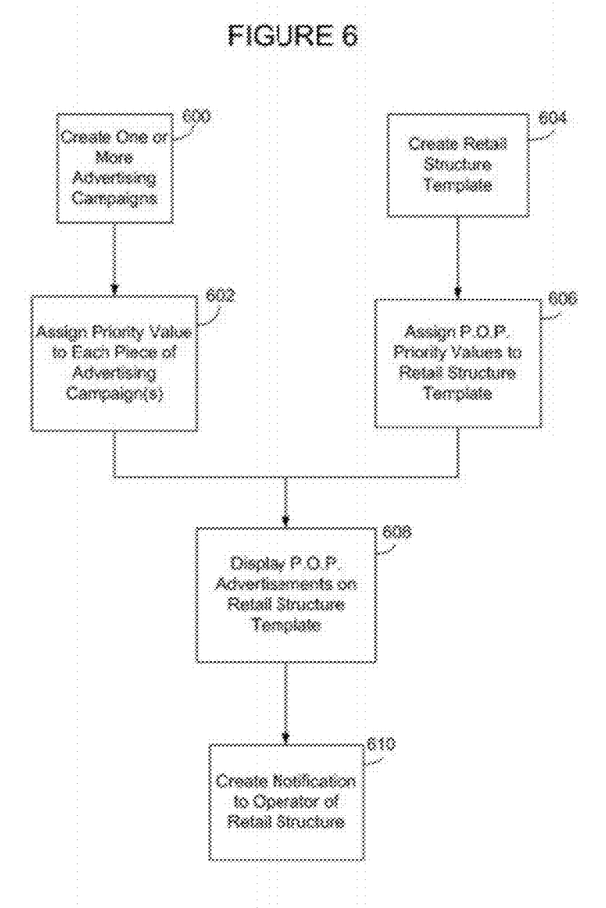
FIG. 6 illustrates an exemplary process for determining placement various for a retail structure according to an embodiment.

FIG. 6 illustrates a flowchart outlining an exemplary process for performing the template building and advertisement placement location determination as discussed above in regard to FIGS. 1-5. The process may include creating 600 one or more advertising campaigns. As discussed above, an advertising campaign may include various pieces of advertising such as window panels, banners, overlays, and cutouts. The one or more advertising campaigns may be created by an advertising agency representing a chain of retail structures, an advertising agency owned and operated by the chain of retail structures, an advertising agency working for a specific retail structure co-op, or another similar agency. The one or more advertising campaigns may be reviewed by an executive at the restaurant chain or the co-op, and approved for distribution. Before distribution, each piece of the various advertising campaigns may be assigned 602 an item priority value and a type code which may be used to determine the placement of each piece of the advertising campaigns in each retail structure.

Similarly, as outlined in the discussion of FIGS. 1-5, a template may be created 604 for each retail structure in a chain or co-op of retail structures. During creation 604, P.O.P. priority values may be assigned 606 to various advertisement placement locations in the template of the retail structure. During assigning 606, various advertisement placement locations on the retail structure may be determined by a user and, based upon various criteria such as traffic passing that location, may be assigned P.O.P. priority values.

It should be noted that the creation 604 of the template and assignment 606 of P.O.P. priority values may be performed once for each retail structure and saved for use during subsequent advertising campaigns. However, after saving the template to a database or other similar data structure, the template may be edited at a later time to assign 606 altered P.O.P. priority values to additional advertisement placement locations as a result of changes to the retail structure or changes to the surrounding environment of the retail structure. For example, if a tree grows to cover a particular window, the covered window may be assigned a lower P.O.P. priority value.

Once the priority values are assigned 602 for the one or more advertising campaigns, and each P.O.P. priority value is assigned 606 to advertisement placement locations of a particular retail structure, the template may be loaded from the database, the various advertisement placement locations on the template may be determined and the P.O.P. priority values for each advertisement placement location may be determined. The various pieces of the advertising campaigns may be received by a computing device and, based upon the priority values and type codes assigned to each piece of the advertising campaign, each piece of advertising may be displayed 608 on the template of the retail structure in an appropriate advertisement placement location, thereby providing a visual representation of the retail structure with the proper placement of the advertising campaign materials. A printed or saved visual notification of the retail structure may be created 610 from the displayed 608 template, and the notification may be provided to an operator of the retail structure, indicating to the operator where each of the advertising campaign materials are to be displayed on the retail structure. The notification may be provided to the operator via a communication such as an email message, as a printed document included in a shipment of the advertising pieces, as a document available at a website associated with the retail location, or various other standard information distribution methods. The communication may include a report outlining where each of the advertising campaign items are to be displayed in the retail structure, thereby potentially eliminating or reducing confusion an installation crew may have about where a particular advertising piece is to be displayed.

The process as illustrated in FIG. 6 may be repeated for each retail structure in a co-op, specifically the creation 604 of the template, the assigning 606 of the P.O.P. priority values, the displaying 608 the P.O.P. advertisements on the template, and the creating 610 a notification to an operator of a retail structure, thereby resulting in each retail structure in the co-op having a semi-uniform layout of any pieces contained in the advertising campaign. Based upon this semi-uniform layout, the advertising agency or management overseeing the advertising campaign may ensure that a specific message or advertising piece is displayed in an appropriate priority display location in each retail structure, thereby providing an appropriate level of visibility for that particular message or advertising piece across a co-op of retail structures. A semi-uniform layout may also provide the advertising agency or management a method of verifying that a retail structure is properly displaying various pieces of advertising during one or more campaigns.

Figure 7:
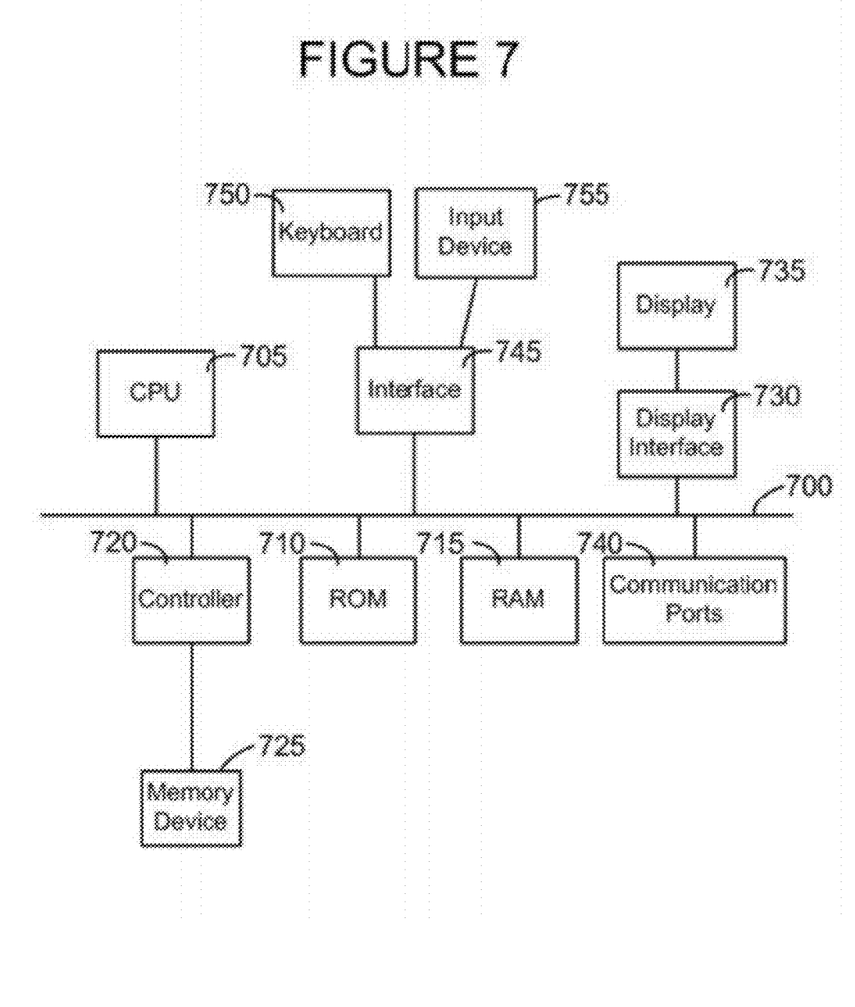
FIG. 7 illustrates various embodiments of a computing device for implementing various methods and processes described herein.

FIG. 7 depicts a block diagram of exemplary internal hardware that may be used to contain or implement program instructions such as the instructions for displaying the user interface shown in FIGS. 1-5, as well as instructions for performing the process shown in FIG. 6. A bus 700 serves as the main information highway interconnecting the other illustrated components of the hardware. CPU 705 is the central processing unit of the system, performing calculations and logic operations required to execute a program. Read only memory (ROM) 710 and random access memory (RAM) 715 constitute exemplary memory devices.

A controller 720 interfaces with one or more optional memory devices 725 to the system bus 700. These memory devices 725 may include, for example, an external or internal DVD drive, a CD ROM drive, a hard drive, flash memory, a USB drive or the like. As indicated previously, these various drives and controllers are optional devices. Additionally, the memory devices 725 may be configured to include individual files for storing any feedback information, common files for storing groups of feedback information, or one or more databases for storing the feedback information.

Program instructions, software or interactive modules for providing the digital marketplace and performing analysis on any received feedback may be stored in the ROM 710 and/or the RAM 715. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 730 may permit information from the bus 700 to be displayed on the display 735 in audio, visual, graphic or alphanumeric format. Communication with external devices may occur using various communication ports 740. An exemplary communication port 740 may be attached to a communications network, such as the Internet or an intranet.

The hardware may also include an interface 745 which allows for receipt of data from input devices such as a keyboard 750 or other input device 755 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of determining point-of-purchase placement locations for printed promotional materials on a retail structure comprising:

loading, by an application running on a processing device from a database stored on a computer readable medium, data representative of a retail structure;

determining, by the processing device, a plurality of advertisement placement locations on the retail structure;

determining, by the processing device, a point-of-placement priority value for each of the plurality of advertisement placement locations, wherein the point-of-placement priority values represent a priority level of each of the plurality of placement locations;

receiving, by the processing device, an advertising campaign comprising data representing a plurality of advertising campaign items, each item including an associated item priority value, wherein the associated item priority values represent a priority level of each of the plurality of advertising campaign items;

determining, by the processing device, a location on the retail structure for each of the advertising campaign items based upon the item priority values and the point-of-placement priority values, wherein the determining a location on the retail structure comprises:

comparing, by the processing device, the item priority value for each advertising campaign item against the point-of-purchase priority value, and based upon the comparison, assigning a position on the retail structure for each item in the advertising campaign such that the priority level for each item in the advertising campaign satisfies the priority level for its assigned position; and providing, by the processing device, a communication to an operator of the retail structure indicating where each of the advertising campaign items is to be displayed on the retail structure;

wherein said retail structure comprises a physical standalone structure, or a physical counter service location occupying a space in a larger, potentially shared structure, or any combination thereof.

2. The method of claim 1, wherein the comparing comprises comparing, by the processing device, the item priority and an associated type code for each advertising campaign item against the point of purchase priority value, wherein the associated type code indicates what type of advertisement placement location is required for each advertising item.

3. The method of claim 1, wherein each item in the advertising campaign further includes an associated type code, wherein the associated type code indicates what type of advertisement placement location is required for each advertising item.

4. The method of claim 1, wherein the providing a report comprises generating a report containing a graphic showing elements of the retail structure and positions on which the advertising campaign items are to be placed.

5. The method of claim 1, wherein the point-of-placement priority value is determined based upon a level of traffic passing the ad placement position.

6. The method of claim 1, wherein the advertising campaign items comprise at least one of posters, window displays, banners, counter displays, menu displays, cash register overlays, free standing cutouts, and dynamic advertisements configured to be displayed on at least one electronic display.

7. The method of claim 1, wherein the loading data representative of the retail structure comprises generating at least one view of the retail structure.

8. The method of claim 7, wherein the at least one view comprises the plurality of advertisement placement locations.

9. The method of claim 8, further comprising:
storing, in the database, the at least one view of the retail structure, the point-of-placement priority values for each advertisement placement location, and the locations for each advertising campaign items as a retail structure template.

10. A system for determining point-of-purchase placement locations for printed promotional materials on a retail structure comprising:
a processing device; and
a non-transitory computer readable storage medium in communication with the processing device, wherein the computer readable medium comprises one or more programming instructions for:
loading, by an application running on a processing device from a database stored on a computer readable medium, data representative of a retail structure,
determining, by the processing device, a plurality of advertisement placement locations on the retail structure,
determining, by the processing device, a point-of-placement priority value for each of the plurality of advertisement placement locations,
receiving, by the processing device, an advertising campaign comprising data representing a plurality of advertising campaign items, each item including an associated item priority value,
determining, by the processing device, a location on the retail structure for each of the advertising campaign items based upon the item priority values and the point-of-placement priority values, and
providing, by the processing device, a communication to an operator of the retail structure indicating where each of the advertising campaign items is to be displayed on the retail structure;
wherein said retail structure comprises a physical standalone structure, or a physical counter service location occupying a space in a larger, potentially shared structure, or any combination thereof.

11. The system of claim 10, wherein the programming instructions for comparing comprise additional programming instructions for comparing, by the processing device, the item priority and an associated type code for each advertising campaign item against the point of purchase priority value, wherein the associated type code indicates what type of advertisement placement location is required for each advertising item.

12. The system of claim 10, wherein each item in the advertising campaign further includes an associated type code, wherein the associated type code indicates what type of advertisement placement location is required for each advertising item.

13. The system of claim 10, wherein the programming instructions for providing a report comprise additional programming instructions for generating a report containing a graphic showing elements of the retail structure and positions on which the advertising campaign items are to be placed.

14. The system of claim 10, wherein the positional value is determined based upon a level of traffic passing the ad placement position.

15. The system of claim 10, wherein the advertising campaign items comprise at least one of posters, window displays, banners, counter displays, menu displays, cash register overlays, free standing cutouts, and dynamic advertisements configured to be displayed on at least one electronic display.

16. The system of claim 10, wherein the program instructions for loading data representative of the retail structure comprise programming instructions for generating at least one view of the retail structure.

17. The system of claim 16, wherein the at least one view comprises the plurality of advertisement placement locations.

18. The system of claim 17, further comprising programming instructions for storing, in the database, the at least one view of the retail structure, the point-of-placement priority values for each advertisement placement location, and the locations for each advertising campaign items as a retail structure template.

* * * * *